| United States Patent [19] | [11] | 4,155,773 |
|---|---|---|
| Ferrill, Jr. | [45] | May 22, 1979 |

[54] PROCESS FOR PRODUCING PIGMENTED RESIN PARTICLES

[75] Inventor: Richard M. Ferrill, Jr., Glens Falls, N.Y.

[73] Assignee: Hercules Incorporated, Wilmington, Del.

[21] Appl. No.: 814,820

[22] Filed: Jul. 12, 1977

[51] Int. Cl.$^2$ .............................................. C08J 3/20
[52] U.S. Cl. ............................. 106/309; 106/308 Q; 106/308 M; 106/30; 106/193 R
[58] Field of Search ............... 106/309, 308 Q, 288 Q, 106/308 M, 193 R

[56] References Cited

U.S. PATENT DOCUMENTS

| 3,296,001 | 1/1967 | Ambler et al. ...................... 106/309 |
| 3,437,503 | 4/1969 | Massam et al. ...................... 106/309 |
| 3,751,279 | 8/1973 | Papenfuss ........................... 106/309 |
| 3,925,096 | 12/1975 | Karkov .............................. 106/309 |
| 4,055,439 | 10/1977 | Babler et al. ..................... 106/288 Q |

*Primary Examiner*—Patrick Garvin
*Assistant Examiner*—J. V. Howard
*Attorney, Agent, or Firm*—Hazel L. Deming

[57] ABSTRACT

A process for producing pigmented resin particles which are readily dispersible in fluid ink systems is described. The process involves the steps of milling pigment and certain water-insoluble, alcohol-soluble resins in aqueous medium in the presence of a small amount of certain organic solvents of Class III which have a solubility parameter within the range of the resin and a water solubility of 0.1 to about 5.0 grams/100 grams of water at 20° C., separating the resulting particles from the aqueous medium and recovering the particles.

10 Claims, No Drawings

PROCESS FOR PRODUCING PIGMENTED RESIN PARTICLES

This invention relates to a process for producing pigmented resin particles which are readily dispersible in fluid ink systems and to the pigmented resin particles so produced.

In the past various methods have been proposed for the formation of pigmented resin particles or predispersed pigments as they are sometimes called. One such method is described by Vesce in U.S. Pat. No. 2,649,382 and involves milling the pigment and resin in a specific grinding medium containing water and a water-miscible organic liquid which is at least a partial solvent for the resin and is present in an amount sufficient to attack the resin and make it receptive to the entrance and dispersion of the pigment. Another method is described by Vesce in U.S. Pat. No. 2,793,195 and is similar except that the grinding medium contains not only water and the water-miscible solvent for the resin, but also a minor proportion of a water-immiscible solvent for the resin. Although both Vesce processes give good dispersions, the requirement that relatively large amounts of low boiling organic solvents must be used makes the processes unattractive from both an economical and an ecological standpoint.

In U.S. Pat. No. 3,925,096, Karkov discloses that the necessity of using large amounts of water-miscible solvents in the formation of pigmented resin particles can be avoided by milling the pigment and resin in water in the presence of a water-immiscible solvent or solvent mixture which is soluble in but incapable of dissolving the resin. Solvents which meet the above criteria have solubility parameters immediately above or below the solubility parameter range of the resin and are in general weakly or moderately hydrogen-bonded solvents which have low flash points and/or are difficult to remove from the resin particles. Although the amount of solvent required to achieve good dispersibility characteristics at high pigment levels in Karkov's process is lower than that required for Vesce's processes, relatively large amounts of potentially hazardous solvents are still required. Thus, any economic advantages are offset by safety requirements, and limited commercial acceptability.

Now, in accordance with the present invention, it has been found that the above disadvantges can be avoided and that good quality pigmented resin particles can be produced in a form which is readily dispersible in fluid ink systems by milling the pigment and at least one water-insoluble resin having a solubility parameter of 9.5 to 14.5 in Class III solvents at a pigment:resin weight ratio of 0.8;1 to 2.5:1 in aqueous medium in the presence of from 10 to 50% by weight of said resin of an organic solvent of Class III having a solubility parameter within the range of said resin and a water solubility at 20° C. of 0.1 to about 5.0 grams/100 grams of water, until an intimate dispersion of pigmented resin particles is formed, separating the particles from the aqueous medium, and recovering the particles.

The pigmented resin particles produced in accordance with this invention are intensely colored, finely divided particles of pigment intimately dispersed in the resin. The particles are essentially agglomerate-free and the particle size closely approaches the ultimate particle size of the pigment. If desired, and such is usually preferred, the particles can be pulverized to a fine powder, either before or after drying, as for example, in a hammer mill.

The process of the invention, as stated, involves the steps of milling pigment and certain water-insoluble resins in aqueous medium in the presence of a small amount of certain Class III solvents, separating the particles from the aqueous medium and recovering the particles.

The water-insoluble resins which are well suited for use in fluid ink systems have a solubility parameter within the range of 9.5 to 14.5 in Class III solvents and are in general the alcohol-soluble, water-insoluble cellulose ethers such as ethyl cellulose, the cellulose esters such as cellulose butyrate, cellulose acetate butyrate and cellulose acetate propionate, the rosin esters such as the modified pentaerythritol or glycerol esters of rosin, hydrogenated rosin, modified rosin or dimeric resin acids, and the poly(fatty acid amides) such as the condensates of saturated or unsaturated fatty acids and polyamines. The above resins are commercially available and usually have good compatibility with nitrocellulose and good film-forming characteristics. The preferred resins include the ethyl celluloses having a D.S. (degree of substitution) of about 2.4 to about 2.6 and a viscosity of less than 100 cps. and preferably less than 50 cps. as measured on a 5% solution in toluene:ethanol (80:20) at 25° C.; the cellulose acetate butyrates having an acetyl content from about 2 to about 30%, a butyryl content from about 48 to about 17.5% and a high hydroxyl content, preferably of the order of about 4 to 5% and a Brookfield viscosity of less than about 150 cps. as measured on a 15% solution in toluene:ethanol (80:20) at 25° C.; the thermoplastic resin based largely on a pentaerythritol or glycerol ester of a modified rosin and having a high acid number, preferably about 70 to about 200 and a high softening point, preferably about 110 to 175° C. (Hercules drop method); and the poly(fatty acid amides) such as the condensation products of oleic acid, linoleic acid, polymerized oleic acid, dihydroxy stearic acid, hydrogenated tallow or castor oil fatty acids and polyamines such as ethylene diamine, diethylene triamine and the like. Also useful, although not as readily available commercially, are cellulose butyrate and cellulose acetate propionate. Particularly preferred resins together with solubility parameters in Class III solvents are tabulated below.

| Resin | Solubility Parameter Range |
|---|---|
| Ethyl cellulose (D.S. 2.42–2.53) | 9.5–14.5 |
| Modified Pentaerythritol esters of rosin (acid # 73–145, drop softening point of 113°–137° C.) | 9.5–14.5 |
| Poly(fatty acid amide) from dimerized fatty acid and polyamine (softening point 112°–121° C.) | 10.3–13.5 |
| Cellulose acetate butyrate (acetyl content 2.0%, butyryl content 47.0%, hydroxyl content 4.7%) | 12.7–14.5 |

Pigments which can be used in accordance with this invention are any of the insoluble colorants normally used for the coloring of inks. These include the inorganic and organic prime pigments, extender pigments, metallic pigments, the various finely-divided channel and furnace blacks and the like. The pigments can be dry or in presscake form. Presscakes are preferred where possible as these avoid the aggregation that normally occurs during drying of the pigment. Particularly preferred are the organic pigments such as the diarylide yellows, the phthalocyanine blues and greens, the quinacridone reds and violets, dioxazine violet, calcium rubiness, and the like.

The pigment to resin weight ratio during milling can vary within relatively wide limits, depending, of course, upon the degree of pigmentation desired. Usually, in order to optimize dispersibility characteristics, the pigment to resin ratio will range from 0.8:1 to 2.5:1, and preferably will range from 1.0:1 to 1.8:1.

As stated above, the pigment and resin are milled in aqueous medium in the presence of from 10 to 50% by weight of the resin of certain Class III solvents, Solvents of Class III (the strongly hydrogen-bonded solvents such as alcohols and amines) are described in The Journal of Paint Technology, 38, No. 496, pages 269-280 (May 1966) and those solvents which are useful in the process of this invention have a water solubility at 20° C. of 0.1 to about 5.0 grams/100 grams of water and a solubility parameter within the range of the resin, i.e., between 9.5 and 14.5. The preferred solvents of Class III will also have a flash point above about 60° C. Particularly preferred solvents include n-hexanol, cyclohexanol, 2-ethylhexanol, benzyl alcohol and aniline. It is, of course, understood that mixtures of solvents can also be used, and that each solvent of the mixture need not individually meet both of the above requirements provided the mixture thereof satisfies the water solubility and solubility parameters. The water solubility of the solvent is important to the extent that the advantages of this invention will not be realized in full outside the limits recited. Thus, if the water solubility exceeds about 5.0 grams/100 grams of water, much larger amounts of solvent are required and the economic advantages are destroyed. On the other hand, when the water solubility falls below 0.1 gram/100 grams of water, the solvent is difficult to remove and the economic advantages are decreased. Preferably, for convenience and optimum efficiency the solvent selected will have a water solubility at 20° C. within the range of 0.5 to 5.0, and most preferably 0.6 to 4 grams/100 grams of water. The Class III solvents which are useful in the process of this invention must also have a solubility parameter within the range of that of the resin employed. The solubility parameter of a solvent or mixture of solvents is a numerical constant which is defined as the square root of its cohesive energy density and is published in The Journal of Paint Technology, supra.

The amount of solvent present during milling should, of course, be in excess of its water solubility and should be sufficient to soften the resin and make it receptive to the pigment, but should not completely dissolve the resin or make it gummy or tacky. Practically, based on the amount of resin used, the range for the solvent will be from 10 to 50% and preferably from 25 to 30%.

As stated, the milling is carried out in aqueous medium. In practice, the amount of water present will vary with the pigment but should be sufficient to give a fluidity to the mixture which permits effective milling action. Usually, the solids content (pigment plus resin) will be from about 10 to about 50%. Milling can be carried out in a pebble mill, paddle-stirred ball mill or any apparatus designed to produce grinding by impact. Optionally, and such is usually preferred, a small amount, as for example, of the order of about 10 to about 30% by weight of the pigment of a surfactant will be present to enhance pigment dispersion. The surfactant can be any anionic, cationic or nonionic surfactant which modifies the properties of a liquid medium at a surface or interface, usually by reducing surface tension or interfacial tension. The preferred surfactants are ionic, are water and alcohol soluble and are capable of being converted to a water-insoluble, oil-soluble form. Typical anionic surfactants include sodium oleate, sodium laurate, sodium palmitate, sodium stearate, sodium naphthenate, sulfonated castor oil, sulfonated petroleum, sulfonated tall oil and the like. Also acceptable are anionic surfactants such as Tergitol 4 (the sodium sulfate derivative of 7-ethyl-2-methyl-4-undecanol), Igepon AC-78 (the coconut oil acid ester of sodium isethionate) and Aerosol 22 (tetrasodium-N-(1,2-dicarboxyethyl)-N-octadodecyl sulfosuccinimate).

The cationic surfactants which are suitable include primary, secondary or tertiary amines and the quaternization products derived therefrom. The preferred primary amines are fatty acid or mixed fatty acid amines containing 6 to 18 carbon atoms, and particularly cocoamine. Secondary and tertiary amines and quaternary ammonium compounds from fatty amines containing from 8-22 carbon atoms are also particularly useful. Typical of the tertiary amines are the heterocyclic tertiary amines such as the alkyl imidazolines and oxazolines which form water-soluble salts with various acids, and the polyethoxylated amines containing a fatty acid radical containing from 12-20 carbon atoms. The chain length of the alkyl substituent group of the tertiary amine is important only as it affects water solubility of the free base and effectiveness of the water-soluble salt as a wetting agent. Quaternary ammonium compounds of the general formula

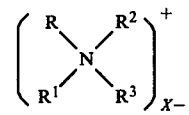

where R is an aliphatic hydrocarbon group containing 8-22 carbon atoms, and $R^1$, $R^2$ and $R^3$ are alkyl, aryl or alkaryl groups or together with the nitrogen atom form a heterocyclic ring and X is an anion such as halogen are particularly useful. Specific examples of quaternary ammonium compounds include disoya dimethylammonium chloride, dicocodimethyl ammonium chloride, octadecyl octadecenyl diethyl ammonium chloride and the like. Typical compounds wherein the substituents form a heterocyclic ring, for instance a pyridine or morpholine ring with the nitrogen atom include laurylpyridinium chloride, dodecyl-methyl morpholinium chloride, and the like.

In addition to the use of anionic or cationic surfactants alone or in combination as a salt or soap complex, it is possible to use nonionic surfactants. A wide variety of nonionic surfactants are known and suitable. Particularly useful are the polyether alcohols, and alkylene oxide-alkylene diamine block polymers, the polyoxyethylene glycol or polyoxyethylene glycerol esters of such acids as coconut fatty acid, stearic acid, oleic acid and rosin/fatty acid combinations, monoesters of polyhydric alcohols and particularly the fatty acid esters such as the lauric ester of sorbitol, and the like.

Milling can be carried out at ambient or other temperatures and usually is carried out at a temperature below the softening point of the resin, typically at between about 15 and 40° C. The milling time should be sufficient to provide an intimate dispersion of the pigment and resin and will vary, depending upon the particular apparatus employed. Usually, in a pebble mill the time will vary from 16 to 100 hours.

Following milling, the charge is withdrawn and the pigmented resin particles separated from the aqueous medium. Separation can be accomplished in any convenient manner such as decantation, filtration, centrifugation, or the like. After removal of at least the bulk of the aqueous medium, the particles are preferably washed to remove any residual solvent and dried in conventional manner. Prior to or following drying, the particles can be ground to reduce the product to a powder form.

An important advantage of the process of this invention over the prior art processes is the ease, safety and economies with which readily dispersible pigmented resin particles can be produced. Thus, the process is commercially attractive both from an economical and ecological standpoint. Additionally, the pigmented resin particles produced according to the process of this invention are of exceptionally high quality and uniformity, are readily dispersible in fluid ink systems and provide films of outstanding color strength, gloss and transparency. They are ideally suited for use in fluid inks of the low viscosity type such as gravure and flexographic inks.

Having described the invention generally, the following examples are given to illustrate specific embodiments thereof. All parts and percentages are by weight unless otherwise indicated.

EXAMPLE 1

A grinding vessel containing ½" flint pebbles in an amount equal to about 2/5 of the capacity of the vessel was charged with 220 parts of water, 95.6 parts of copper phthalocyanine green presscake (equivlent to 28 parts of dry pigment CI 74260), 4.92 parts of n-hexanol, 21.0 parts of a 27% solution of the sodium sulfate derivative of 7-ethyl-2-methyl-4-undecanol (anionic surfactant) and 22.4 parts of ethyl cellulose having a degree of substitution of 2.4–2.5, a solubility parameter in Class III solvents of 9.5 to 14.5 and a viscosity of 4 cps. when measured as a 5% solution in 80:20 toluene:ethanol at 25° C. The vessel was rotated for 40 hours at 90 r.p.m. at room temperature, following which time 5.1 parts of lauryl pyridinium chloride (cationic surfactant) was added to the vessel and rotation continued for an additional 3 hours. The charge was next washed from the vessel onto a vacuum filter and the solids were washed four times with 500 part portions of cold water, dried for 16 hours at 70° C. and then osterized. The product contained 46.1% of pigment, 36.9% of ethyl cellulose and 17.0% of the surfactant combination.

The dispersibility characteristics of the pigment composition of this example were evaluated in a gravure ink as follows. An ink formulation was prepared by stirring 35.8 parts of the pigment composition of this example (equal to 16.5 parts toner) for 15 minutes with 67.0 parts of a nitrocellulose solution containing 24.5 parts of RS, half-second nitrocellulose, 37.7 parts of ethyl alcohol (anhydrous), 18.9 parts of isopropyl alcohol and 18.9 parts of isopropyl acetate, using a Cowless disperser, adding an additional 66 parts of the nitrocellulose solution and stirring for 2 minutes and then adding sufficient of a solvent mixture of anhydrous ethyl alcohol, isopropyl alcohol and isopropyl acetate (50:20:25) with stirring to give 330 parts of an ink containing 5.0% of copper phthalocyanine green pigment and 9.9% of nitrocellulose. The resulting ink gave a Hegman gauge reading greater than 7½. When 40 parts of the ink were thinned with 20 parts by volume of the solvent mixture, the ink had a viscosity of 17 seconds, #2 Zahn cup.

For comparative purposes a control ink formulation was prepared by ball milling 27.45 parts of a commercial copper phthalocyanine green pigment CI 74260 (DuPont GT-793D) with 55.95 parts of the nitrocellulose solution and 66.6 parts of the solvent mixture for 40 hours at room temperature and then letting down 27.3 parts of the resulting paste with 30.6 parts of the nitrocellulose solution, 40.1 parts of the solvent mixture and 2.0 parts of dioctyl phthalate. The resulting ink contained 5% of the pigment and 10% of the nitrocellulose and gave a Hegman gauge reading of greater than 7½. When 40 parts of the ink were reduced with 20 parts by volume of the solvent mixture, the ink had a viscosity of 22 seconds, #2 Zahn cup.

Draw-downs on foil using a #2 wire showed that the color intensity of the film produced from the ink containing the pigment of this example was equal to that of the control but exhibited much better gloss and transparency.

A second control ink formulation was also prepared in the same manner as the control except that mixing was carried out using a Cowles disperser instead of the ball mill. The ink of this control gave a Hegman gauge reading of zero and the draw-down was very weak, without gloss or transparency.

EXAMPLE 2

The procedure of Example 1 was repeated except that no lauryl pyridinium chloride was added, the charge was rotated for 64 hours and the charge was washed directly into a drying vessel and dried (without filtration and washing). The pigment composition of this example contained 50% of copper phthalocyanine green pigment, 39.8% of the ethyl cellulose and 10.2% of the anionic surfactant.

When the pigment composition of this example was evaluated at a 5% toner level in a gravure ink according to the procedure of Example 1, the dispersibility characteristics and film properties were identical to those obtained with the pigment composition of Example 1. The National Printing Ink Research Institute grindometer test on the ink gave a fineness reading of less than 1, indicating that there were essentially no particles in the ink having a size greater than 5.0 microns.

EXAMPLE 3

The procedure of Example 1 was repeated except that no anionic surfactant was present, the amount of ethyl cellulose was increased to 28.0 parts, no lauryl pyridinium chloride was added and the charge was rotated for a total of 93 hours. The pigment composition of this example contained 50% of copper phthalocyanine green and 50% of the ethyl cellulose. When the pigment composition was tested in a gravure ink according to the procedure of Example 1, the ink gave a Hegman gauge reading of 7. The drawn-down film on foil was not as glossy and transparent as the film of Example 1 but was equal in all respects to the ball-milled control ink of Example 1.

EXAMPLE 4

The general procedure of Example 1 was repeated except that the vessel was charged with 220 parts of water, 97.6 parts of copper phthalocyanine green presscake (equivalent to 28 parts of dry pigment CI 74260), 6.15 parts of n-hexanol, 1.4 parts of sorbitan mnolaurate (nonionic surfactant), 4.2 parts of cocoamine (cationic surfactant), 0.67 part of 28% aqueous ammonium hydroxide, 2.8 parts of pentaerythritol ester of modified rosin having a drop softening point (Hercules method) of 118° C., an acid number of 78, a solubility parameter in Class III solvents of 9.5–12.7, and a Gardner-Holdt viscosity at a 60% solids solution in ethanol at 25° C. of E, 2.8 parts of a pentaerythritol ester of modified rosin having a drop softening point of 131° C., an acid number of 140 and a solubility parameter in Class III solvents of 9.5–12.7, and 16.8 parts of the ethyl cellulose of Example 1; no lauryl pyridinium chloride was added; and the ball-milled charge was washed directly into a drying vessel and dried for 40 hours at 70° C. The pigment composition of this example contained 50% of the copper phthalocyanine pigment, about 30% of the ethyl cellulose, 10% of the pentaerythritol esters of modified rosin and 10% of the surfactant combination. When the pigment composition was tested in a gravure ink according to the procedure of Example 1, the ink gave a Hegman gauge reading greater than 7½. The drawn-down film on foil had a color intensity equal to that of Example 1, but slightly better gloss and much better transparency.

EXAMPLE 5

The procedure of Example 4 was repeated except that the charge container 220 parts of water, 90.0 parts of a copper phthalocyanine presscake containing 28.0 parts pigment, dry basis, 6.56 parts of n-hexanol, 2.10 parts of sorbitan monolaurate, 2.80 parts of cocoamine, 2.0 parts of 28% aqueous ammonium hydroxide, 11.2 parts of a pentaerythritol ester of modified rosin having a drop softening point of 118° C., an acid number of 78 and a solubility parameter in Class III solvents of 9.5 to 12.7 and 11.2 parts of ethyl cellulose having a degree of substitution of 2.4–2.5, a solubility parameter in Class III solvents of 9.5 to 14.5 and a viscosity of 6–8 cps. (5% solution in 80:20 toluene:ethanol at 25° C.). The pigment composition of this example contained 50.6% of the copper phthalocyanine pigment, 20.3% of the ethyl cellulose, 20.3% of the pentaerythritol ester of modified rosin and 8.8% of the surfactant combination. When the pigment composition of this example was tested in gravure ink according to the procedure of Example 1, the ink gave a Hegman gauge reading of greater than 7½. The viscosity of the ink (40 parts diluted with 20 parts by volume of the solvet mixture) was 21 seconds, #2 Zahn cup. When the drawn-down film was compared with that of Example 1, the pigment composition of this example gave slightly better color intensity, slightly better gloss and much better transparency.

For comparativve purposes a control ink was prepared as follows. A mixture of 117 parts of Monastral Fast Green GX powder (CI 74260), 192.9 parts of a 70% dispersion of RS nitrocellulose, ½ second in isopropyl alcohol and 48.0 parts of dioctyl phthalate was 2-roll milled using a mill setting of 24 mils for 2 minutes, 6 mils for 8 minutes and 0 mil for 1 minute, 25 parts of 50:50 anhydrous ethanol:toluol being added gradually during the milling. The resulting product, in the form of "lacquer chips", was then used to form an ink containing 5% of the green pigment, 10% of RS nitrocellulose, 2% of dioctyl phthalate and 83 parts of a solvent mixture of anhydrous ethyl alcohol, isopropyl alcohol and isopropyl acetate (50:25:25) by stirring the ingredients in a Cowles disperser for 45 minutes at 500 r.p.m. The ink gave a Hegman gauge reading of greater than 7½ and, when reduced (40 parts with 20 parts by volume of the solvent mixture), gave a viscosity of 38 seconds, #2 Zahn cup. A drawn-down film on foil exhibited poorer gloss and much less transparency than that from an ink prepared at the same pigment and solids levels using the pigment composition of this example (ink viscosity of 19 seconds, #2 Zahn cup at a 2:1 reduction with the solvent mixture).

EXAMPLE 6

The procedure of Example 4 was repeated except that the charge contained 220 parts of water, 90.0 parts of the presscake of Example 5, 6.15 parts of n-hexanol, 2.10 parts of sorbitan monolaurate, 3.85 parts of cocoamine, 2.5 parts of 28% aqueous ammonium hydroxide, 4.8 parts of the pentaerythritol ester of modified rosin of Example 5, 5.6 parts of commercial 0.4 second cellulose acetate butyrate (acetyl content of 2.0%, butyryl content of 47.0% and hydroxyl content of 4.7%; melting point 150°–160° C.) and 10.6 parts of the ethyl cellulose of Example 5, and the charge was rotated for 64 hours. The product of this example contained 50.9% of the copper phthalocyanine pigment, 8.8% of the pentaerythritol ester of modified rosin, 10.2% of the cellulose acetate butyrate, 19.3% of the ethyl cellulose and 10.8% of the surfactants. When the product of this example was tested in gravure ink according to the procedure of Example 1, the ink gave a Hegman gauge reading greater than 7½ and a viscosity of 25 seconds, #2 Zahn cup, at a 2:1 reduction. Drawn films containing the product of this example exhibited much better gloss and transparency than those containing the product of Example 1.

EXAMPLE 7

The procedure of Example 1 was repeated except that 22.4 parts of a commercial poly(fatty acid amide) having a softening point of 116° C. and a Brookfield viscosity (#3 spindle, 20 r.p.m.) at 160° C. of 7 poises and a solubility parameter in class III solvents of 10.3 to 13.5 (Versamid 750, General Mills Chemicals, Inc.) were substituuted for the ethyl cellulose. The product of this example contained 46.1% of the copper phthalocyanine pigment, 36.9% of the poly(fatty acid amide) and 17.0% of the surfactant combination.

The dispersibility characterisitics of the product of this example were evaluated in a flexographic ink as follows. An ink formulation was prepared by adding 20.0 parts of the product of this example gradually to an agitated solution containing 26 parts of the above poly(fatty acid amide) in 54 parts of n-propyl alcohol in a Cowless disperser, agitating the mixture for 45 minutes at 5000 r.p.m., adding additional n-propyl alcohol to give 200 parts of an ink and continuing agitation for an additional 5 minutes. The resulting ink gave a Hegman gauge reading of greater than 7½ and had a viscosity of 21 seconds, #2 Zahn cup. This ink contained 4.61% of pigment (100% toner basis) and 18.4% of film-forming solids.

For comparative purposes, a control ink containing 5% of a commercial copper phthalocyanine pigment and 18% of the poly(fatty acid amide) was prepared by ball-milling the pigment, poly(fatty acid amide) and n-propyl alcohol for about 40 hours. This ink gave a Hegman gauge reading of greater than 7½ and had a vicosity of 20 seconds, #2 Zahn cup.

When films were drawn down on foil with a #2 wire using the ink containing the product of this example and the control ink, the gloss, transparency and cleanliness of the film containing the product of this example were slightly superior to the ball-milled control.

EXAMPLE 8 the procedure of Example 3 was repeated except that 133.3 parts of diarylide yellow presscake (equivalent to 28 parts of dry pigment yellow 17-CI 21105) were substituted for the 95.6 parts of copper phthalocyanine green presscake and 182 parts of water were used. The pigment composition of this example contained 50% of pigment yellow 17 and 50% of the ethyl cellulose. When the pigment composition was tested in a gravure ink according to the procedure of Example 1, the ink gave a Hegman gauge reading of 7½. The drawn-down film on foil was very glossy and transparent and better than that formed with a control ink prepared by ball-milling a commercial pigment yellow 17 with the nitrocellulose solution.

EXAMPLE 9

The procedure of Example 8 was repeated except that 150.5 parts of calcium 2B rubine red presscake (equivalent to 28 parts of dry pigment CI 15860) were substituted for the diarylide yellow presscake and 165 parts of water were used. The pigment composition of this example contained 50% of pigment and 50% of the ethyl cellulose. When the pigment composition was tested in a gravure ink according to the procedure of Example 1, the ink gave a Hegman gauge reading of 7½. The drawn-down film on foil was glossy and transparent and superior in all respects to a ball-milled control ink from commercial pigment CI 15860.

What I claim and desire to protect by Letters Patent is:

1. A process for producing pigmented resin particles which are readily dispersible by stirring in fluid ink systems, which process comprises milling pigment and at least one water-insoluble, alcohol-soluble resin at a pigment: resin weight ratio of 0.8:1 to 2.5:1 in aqueous medium in the presence of from 10 to 50% by weight of said resin of at least one alcohol which is a solvent for said resin and has a water solubility at 20° C. of 0.5 to about 5.0 grams/100 grams of water, until an intimate dispersion of pigmented resin particles is formed, separating the particles from the aqueous medium, and recovering the particles.

2. The process of claim 1 wherein the pigment is an organic pigment.

3. The process of claim 2 wherein the alcohol is selected from the group consisting of n-hexanol, cyclohexanol, and benzyl alcohol.

4. The process of claim 3 wherein the resin is selected from the group consisting cellulose ethers, cellulose esters, rosin esters, and poly(fatty acid amides).

5. The process of claim 4 wherein the aqueous medium also contains at least one surfactant.

6. The process of claim 5 which includes the step of removing the alcohol from the particles prior to recovery.

7. The process of claim 6 wherein the recovered particles are ground to a powder.

8. The process of claim 7 wherein at least one resin is a cellulose ether.

9. The process of claim 8 wherein the cellulose ether is ethyl cellulose.

10. The process of claim 7 wherein the resin is a poly(fatty acid amide).

* * * * *